UNITED STATES PATENT OFFICE.

SIGRID BREITHOLTZ, OF NEW YORK, N. Y.

COMPOSITION OF MATTER.

1,388,019.  Specification of Letters Patent.  Patented Aug. 16, 1921.

No Drawing.  Application filed June 12, 1920.  Serial No. 388,691.

*To all whom it may concern:*

Be it known that I, SIGRID BREITHOLTZ, a subject of Republic of Finland, and a resident of 40 East 83rd street, in the city of New York, county and State of New York, have invented certain new and useful Improvements in Composition of Matter, of which the following is a specification.

It is a well known fact in the art that tannin, from whatever source derived, produces a tanning or hardening effect upon gelatin in the presence of water, rendering the gelatin stiffer and incapable of absorbing more water. A remotely analogous effect is produced by precipitation upon grain proteids such as the gluten of wheat, zein of maize and others of the same class, according to the amount of tannin used.

However, in the making of pie crust, it is a desideratum to produce a crisp, porous and strong crust which is on the other hand tasty and agreeably fragile. The dough for such a result may primarily contain any good white flour and any fat which will produce the proper shortening effect. Butter is preferable, as it improves the taste and contains approximately the proper amount of salt.

If now a fraction of a teaspoonful of tea leaves is immersed in a glass of water, and the water stirred till a weak infusion results, a small amount of tannin and likewise of thein and other substances are found to be in solution. This infusion is then used by dipping the hands therein and working the flour by the moist fingers. The fingers are thus moistened and the flour and butter worked into dough until of the proper consistency to be baked. No other water is added before or after this treatment. The proportions of the ingredients found most satisfactory are two cups flour to one cup butter and two tablespoons of tea infusion produced by soaking one-half teaspoon of tea leaves in a tumbler of water.

The dough may now be rolled out and used for pies or similar pastry and baked briskly for half an hour, and then subjected to mild heat for a few minutes. The crust is now found unusually crisp, strong and brittle, quite porous and very agreeable to the taste.

The action of the solution upon the flour depends upon the extractives derived from the tea leaves, principally the tannin. The amount of the latter substance is very small, being only about two to five grains to eight ounces of water of the solution.

As other vegetable substances containing tannic acid together with alkaloids of the thein, caffein and nicotin series may produce similar results to those herein described, and also tannin alone could be used in minute quantities to produce this result, I do not desire to be limited to the use of tea leaves as the precipitating ingredient, I reserve all such rights within the scope of my discovery.

Having thus fully described my new composition, I claim:

1. As an article of manufacture, a pastry composition consisting of the following ingredients, namely, flour, a shortening material and a weak infusion of tea leaves, said ingredients being mixed in about the proportion of two cups of flour, one cup of shortening material and two tablespoons of infusion of tea leaves.

2. As an article of manufacture, a pastry composition to be baked into a pie crust consisting of the following ingredients in about the proportions specified, namely, two cups of white flour, one cup of butter and two tablespoons of tea infusion produced by soaking one-half teaspoon of tea leaves in a tumbler of water.

3. As an article of manufacture, a pastry composition consisting of the following ingredients in about the proportions as specified, namely, two cups of white flour, one cup of shortening material and two tablespoons of a weak solution of tannic acid containing an alkaloid of the thein, caffein and nicotin series.

Signed at 132 Nassau street, in the borough of Manhattan, county of New York, city and State of New York this 9th day of June, 1920.

SIGRID BREITHOLTZ.

Witnesses:
C. F. WM. FORSSBERG,
EDWARD CHILSTROM.